(12) United States Patent
Hammarwall et al.

(10) Patent No.: US 10,172,151 B2
(45) Date of Patent: Jan. 1, 2019

(54) NON-CONSECUTIVE SUBFRAMES IN MULTI-TTI SCHEDULING MESSAGES

(71) Applicant: Telefonaktiebolaget L M Ericsson (publ), Stockholm (SE)

(72) Inventors: David Hammarwall, Vallentuna (SE); Daniel Larsson, Vallentuna (SE); Muhammad Imadur Rahman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 603 days.

(21) Appl. No.: 14/648,754

(22) PCT Filed: Jan. 18, 2013

(86) PCT No.: PCT/SE2013/050029
§ 371 (c)(1),
(2) Date: Jun. 1, 2015

(87) PCT Pub. No.: WO2014/098700
PCT Pub. Date: Jun. 26, 2014

(65) Prior Publication Data
US 2015/0305058 A1 Oct. 22, 2015

Related U.S. Application Data

(60) Provisional application No. 61/740,471, filed on Dec. 21, 2012.

(51) Int. Cl.
*H04W 72/04* (2009.01)
*H04W 72/12* (2009.01)
(Continued)

(52) U.S. Cl.
CPC ........... *H04W 72/1263* (2013.01); *H04J 1/00* (2013.01); *H04J 3/12* (2013.01); *H04W 72/042* (2013.01); *H04W 72/1289* (2013.01)

(58) Field of Classification Search
None
See application file for complete search history.

(56) References Cited

U.S. PATENT DOCUMENTS

2009/0175232 A1* 7/2009 Kolding ................ H04L 1/0027
370/329
2010/0322135 A1 12/2010 Van Lieshout et al.
(Continued)

FOREIGN PATENT DOCUMENTS

| EP | 2434818 A1 | 3/2012 |
| EP | 2448347 A1 | 5/2012 |
| WO | 2009022309 A2 | 2/2009 |

OTHER PUBLICATIONS

Motorola, "Downlink Control Signalling for TDD", 3GPP TSG RAN1#52, Sorrento, Italy, Feb. 11, 2008, pp. 1-4, R1-080726, 3GPP.

*Primary Examiner* — Ayaz Sheikh
*Assistant Examiner* — Sori Aga
(74) *Attorney, Agent, or Firm* — Coats & Bennett, PLLC

(57) ABSTRACT

The embodiments herein relate to method in a network node (301) for handling scheduling of a wireless device (305) in a communications network (300). The network node (301) is adapted to communicate with the wireless device (305) over a radio channel (310). The network node (301) dynamically allocates a set of non-consecutive subframes in which the network node (301) is to transmit data to the wireless device (305) or receive data from the wireless device (305). The network node (301) transmits a multi-Time Transmission Interval, TTI, scheduling message to the wireless device (305), which multi-TTI scheduling message comprises information indicating the dynamically allocated non-consecutive subframes.

44 Claims, 10 Drawing Sheets

(51) Int. Cl.
*H04J 1/00* (2006.01)
*H04J 3/12* (2006.01)

(56) References Cited

U.S. PATENT DOCUMENTS

| | | |
|---|---|---|
| 2011/0149813 A1 | 6/2011 | Pakrvall et al. |
| 2012/0021752 A1 | 1/2012 | Hole et al. |
| 2014/0362832 A1* | 12/2014 | Rudolf .................. H04L 1/1822 370/336 |

\* cited by examiner

Fig. 1: The LTE downlink physical resource

Fig. 2: LTE time domain structure

NON-CONSECUTIVE SUBFRAMES IN MULTI-TTI SCHEDULING MESSAGES

TECHNICAL FIELD

Embodiments herein relate generally to a network node, a method in the network node, a wireless device and a method in the wireless device. More particularly, the embodiments herein relate to handling scheduling of the wireless device in a communications network.

BACKGROUND

In a typical communications network, also referred to as e.g. a wireless communications network, a wireless communications system, a communications network or a communications system, a wireless device communicates via a Radio Access Network (RAN) to one or more Core Networks (CNs).

The wireless device may be a device by which a subscriber may access services offered by an operator's network and services outside the operator's network to which the operator's radio access network and core network provide access, e.g. access to the Internet. The wireless device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised or vehicle mounted devices, enabled to communicate voice and/or data, via the radio access network, with another entity, such as another wireless device or a server.

The wireless device is enabled to communicate wirelessly in the communications network. The communication may be performed e.g. between two wireless devices, between a wireless devices and a regular telephone and/or between the wireless device and a server via the radio access network and possibly one or more core networks and possibly the Internet.

The radio access network covers a geographical area which is divided into cell areas. Each cell area is served by a base station, e.g. a Radio Base Station (RBS). In some radio access networks, the base station is also called evolved NodeB (eNB), NodeB or B node. A cell is a geographical area where radio coverage is provided by the base station at a base station site. The base station communicates over the air interface operating on radio frequencies with the wireless device(s) within range of the base station.

LTE Background

LTE is short for Long Term Evolution and is a technology which uses Orthogonal Frequency Division Multiplexing (OFDM) in the DownLink (DL) and Discrete Fourier Transform (DFT)-spread OFDM in the UpLink (UL). Uplink is communication going up from the wireless device to the base station and downlink is communication going down from the base station to the wireless device. OFDM is a method of encoding digital data on multiple carrier frequencies and used in LTE to schedule resources in both the frequency and time domain. DFT-spread OFDM, also referred to as DFTS-OFDM, is a transmission scheme that may combine the desired properties for uplink transmission i.e.:

Small variations in the instantaneous power of the transmitted signal.

Possibility for low-complexity high-quality equalization in the frequency domain.

Possibility for Frequency Division Multiple Access (FDMA) with flexible bandwidth assignment.

Due to these properties, DFT-spread OFDM has been selected as the uplink transmission scheme for LTE.

The basic LTE downlink physical resource may thus be seen as a time-frequency grid as illustrated in FIG. 1, where each resource element 101 corresponds to one subcarrier during one OFDM symbol interval on a particular antenna port. The resource element 101 is the smallest unit within OFDM, which is one OFDM symbol including cyclic prefix transferred on one carrier. Cyclic prefix is used to prefix a symbol with a repetition of the end. The receiver may discard the cyclic prefix. The cyclic prefix serves the purpose as a guard interval to eliminate interference from the previous symbol and as a repetition of the end of the symbol. An antenna port is defined such that the channel over which a symbol on the antenna port is conveyed may be inferred from the channel over which another symbol on the same antenna port is conveyed. There is one resource grid per antenna port. The carrier spacing is 15 kHz, and is used for broadcast and multicast.

LTE downlink transmissions are organized into radio frames of 10 ms in the time domain. Each radio frame comprises ten equally-sized subframes of 1 ms as illustrated in FIG. 2. A subframe is divided into two slots, each of 0.5 ms time duration.

The resource allocation in LTE is described in terms of resource blocks, where a resource block corresponds to one slot in the time domain and twelve contiguous 15 kHz subcarriers in the frequency domain. Two in time consecutive resource blocks represent a resource block pair and corresponds to the highest granularity time interval upon which scheduling operates.

Scheduling is a mechanism where a wireless device requests a network node for the resource allocation during each Transmission Time Interval (TTI). If the wireless device has some data that it needs to transmit continuously, it will request the network node e.g. every TTI, for the resource allocation. This scheduling type may be referred to as dynamic scheduling. The advantage of dynamic scheduling is flexibility and diversity of resource allocation. Using other words, scheduling refers to selection of which wireless device(s) is/are to use the radio resources at each TTI, where one TTI is e.g. 2 ms.

To allow the wireless device to request uplink transmission resources from the network node, LTE provides a Scheduling Request (SR) mechanism. The scheduling request conveys a single bit of information, indicating that the wireless device has data to transmit to the network node.

The scheduling mechanism may be implemented by a scheduler in the network node which assigns the time and frequency resources among wireless devices. A Resource Block (RB) is the smallest element that may be assigned by the scheduler. A downlink physical resource is represented as a time frequency resource grid comprising multiple resource blocks. A resource block is divided in multiple Resource Elements (RE). The scheduler may base its assignment decision on Quality of Service (QoS) information provided by e.g. the wireless device, queuing delay of the data to be transmitted, channel conditions etc.

Because LTE is based on OFDM, it is possible to distribute available transmission resources in the frequency domain to different wireless devices. This allocation may be changed dynamically once per subframe, that is, once per millisecond. The Medium Access Control (MAC) scheduler in the network node is in charge of assigning and scheduling both uplink and downlink radio resources for different wireless devices and their services. The scheduling decision covers not only the resource block assignment but also which modulation and coding scheme to use and whether or not to apply Multiple Input Multiple Output (MIMO) or beam forming.

Transmissions in LTE are dynamically scheduled in each subframe where the base station transmits downlink assignments and/or uplink grants to certain wireless devices, e.g. user equipments, via the physical downlink control information, i.e. Physical Downlink Control CHannel (PDCCH) and evolved PDCCH (ePDCCH). The PDCCHs are transmitted in the first OFDM symbol(s) in each subframe and spans more or less the whole system bandwidth. A wireless device that has decoded a downlink assignment, carried by a PDCCH, knows which resource elements in the subframe that comprises data aimed for the wireless device. A downlink assignment is an assignment of an allocated radio resource to the wireless device. Similarly, upon receiving an uplink grant, the wireless device knows which time/frequency resources it should transmit upon. In LTE downlink, data is carried by the Physical Downlink Shared data CHannel (PDSCH) and in the uplink the corresponding link is referred to as the Physical Uplink Shared CHannel (PUSCH).

The work with defining the enhanced downlink control signaling (ePDCCH) is ongoing in the Third Generation Partnership Project (3GPP). However, it is likely that such control signaling may have similar functionalities as PDCCH, with the fundamental difference of requiring wireless device specific DeModulation Reference Signal (DMRS) instead of Cell-specific Reference Signals (CRS) for its demodulation. One advantage is that wireless device specific spatial processing may be exploited for ePDCCH. DMRS is a physical signal used for coherent demodulation of uplink data and control signaling. CRS is used for both demodulation and measurement purposes.

Multi-TTI Scheduling

As to reduce the scheduling assignment/grant overhead one feature being discussed for inclusion in Release 12 of LTE is multi-TTI scheduling. The TTI in LTE is 1 ms, which corresponds to one subframe. A multi-TTI scheduling assignment/grant indicates to a wireless device that the wireless device is to receive or transmit data involving multiple TTIs. This should not be confused with Semi Persistent Scheduling (SPS), which primarily is used to effectively support low rate streaming services, such as voice calls. Semi persistent scheduling is a semi static allocation, configured by means of Radio Resource Control (RRC) messages. In case of semi persistent scheduling, the network node may assign a predefined chunk of radio resources for Voice over Internet Protocol (VoIP) wireless devices with an interval of 20 ms. Therefore, the wireless device is not required to request resources each TTI, saving control plan overhead. This scheduling is semi persistent in the sense that network node may change the resource allocation type or location if required for link adaptation or other factors.

On the contrary, multi-TTI scheduling is envisioned as a dynamic assignment that is dynamically indicated in a Downlink Control Information (DCI) format, including information of the resource block assignment in frequency. Hence, multi-TTI scheduling is operating at a much higher time granularity than SPS, and provides substantially increased flexibility to change the resource allocation in frequency. A DCI comprises uplink or downlink resource allocation. The PDCCH carries the resource assignment for wireless devices which are comprised in a DCI message.

Scheduling Restrictions

An essential aspect of base station implementation is to minimize the constraints imposed on the allowable scheduling. In particular, the data traffic is dynamic by nature and may change on a very short time scale. In particular, scheduling assignments/grants involving multiple subframes constrains the base station scheduling behavior in the upcoming subframes. For example, if new data reaches the base station, it may not be able to transmit this data until previous scheduling commitments are fulfilled. Such constraints introduce additional delays in the link which may be very detrimental for delay sensitive traffic. Scheduling constraints for uplink transmissions similarly degrades the performance and latency of the communications network. Scheduling restrictions inherently degrades the communications network's adaptability for changes in the radio environment and traffic load.

The existing solutions for multi-TTI scheduling involves mapping of a number of consecutive subframes, which limits the usability to scenarios where such transmissions are indeed suitable. This is not the case in systems in which the interference is coordinated among transmission points or in heterogeneous deployments employing enhanced Inter-Cell Interference Coordination (eICIC), i.e. cell range expansion, where transmission/reception is constrained to certain subframes.

Scheduling assignments/grants involving multiple TTIs, i.e. subframes, has the advantage of reduced scheduling assignment/grant signaling overhead, but comes at the cost of reduced dynamic scheduling flexibility.

SUMMARY

An object of embodiments herein is therefore to provide improved handling of scheduling of a wireless device in the communications network.

According to a first aspect, the object is achieved by a method in a network node for handling scheduling of a wireless device in a communications network. The network node is adapted to communicate with the wireless device over a radio channel. The network node dynamically allocates a set of non-consecutive subframes in which the network node is to transmit data to the wireless device or receive data from the wireless device. The network node transmits a multi-TTI scheduling message to the wireless device. The multi-TTI scheduling message comprises information indicating the dynamically allocated non-consecutive subframes.

According to a second aspect, the object is achieved by a method in the wireless device for handling scheduling of the wireless device in the communications network. The wireless device is adapted to communicate with the network node over the radio channel. The wireless device receives the multi-TTI scheduling message from the network node. The multi-TTI scheduling message comprises information indicating the set of dynamically allocated non-consecutive subframes in which the wireless device is to transmit data to the network node or to receive data from the network node.

According to a third aspect, the object is achieved by the network node for handling scheduling of the wireless device in the communications network. The network node is adapted to communicate with the wireless device over the radio channel. The network node comprises an allocating unit adapted to dynamically allocate the set of non-consecutive subframes in which the network node is to transmit data to the wireless device or receive data from the wireless device. The network node comprises a transmitter which is adapted to transmit the multi-TTI scheduling message to the wireless device. The multi-TTI scheduling message comprises information indicating the dynamically allocated non-consecutive subframes.

According to a fourth aspect, the object is achieved by the wireless device for handling scheduling of the wireless device in the communications network. The wireless device is adapted to communicate with the network node over the radio channel. The wireless device comprises a receiver adapted to receive the multi-TTI scheduling message from the network node. The multi-TTI scheduling message comprises information indicating the set of dynamically allocated non-consecutive subframes in which the wireless device is to transmit data to the network node or to receive data from the network node.

Since the multi-TTI scheduling message is related to the dynamically allocated non-consecutive subframes, the handling of scheduling of a wireless device in the communications network has been improved.

A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
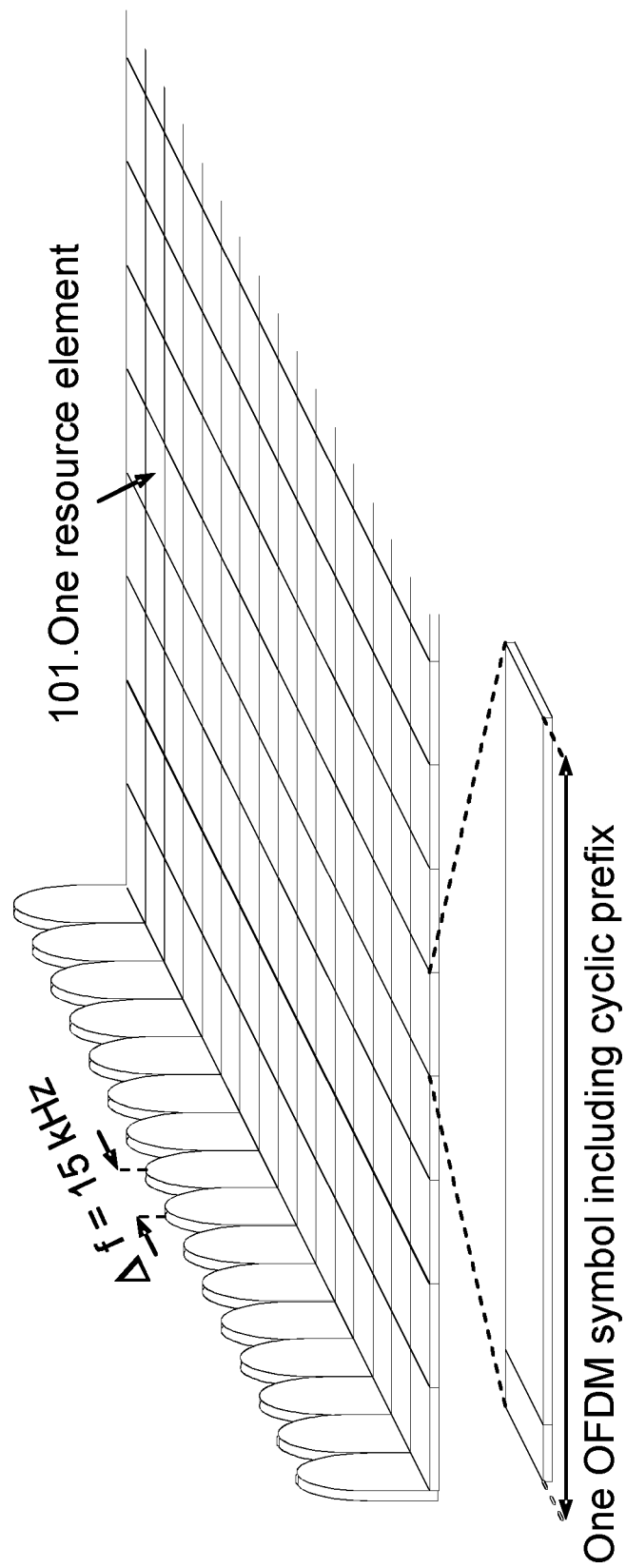
FIG. 1 is a schematic block diagram illustrating embodiments of a LTE downlink physica resource.
Figure 2:
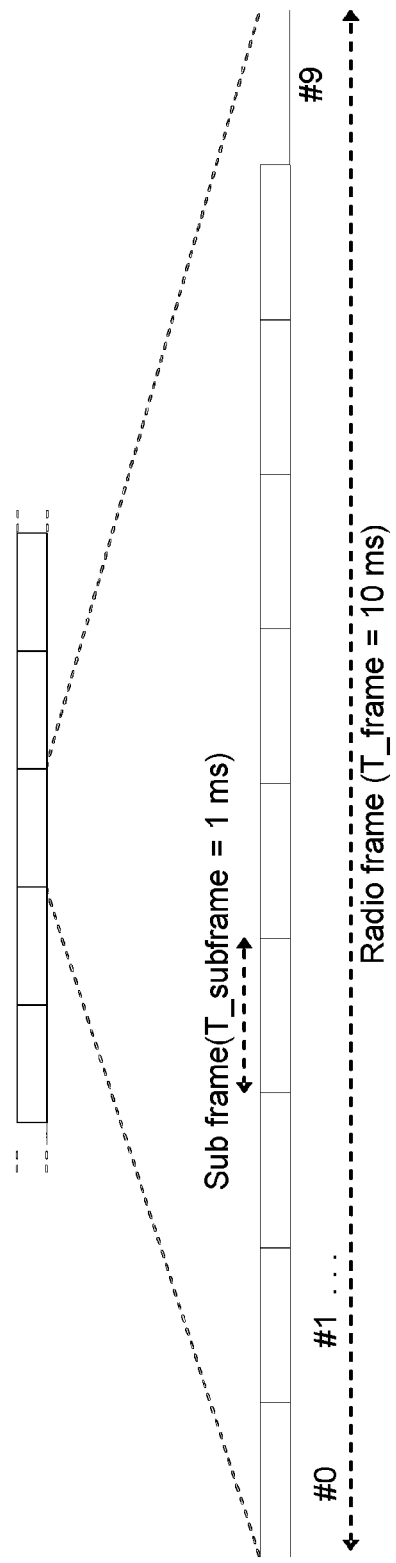
FIG. 2 is a schematic block diagram illustrating embodiments of a LTE time-domain structure.
Figure 3:
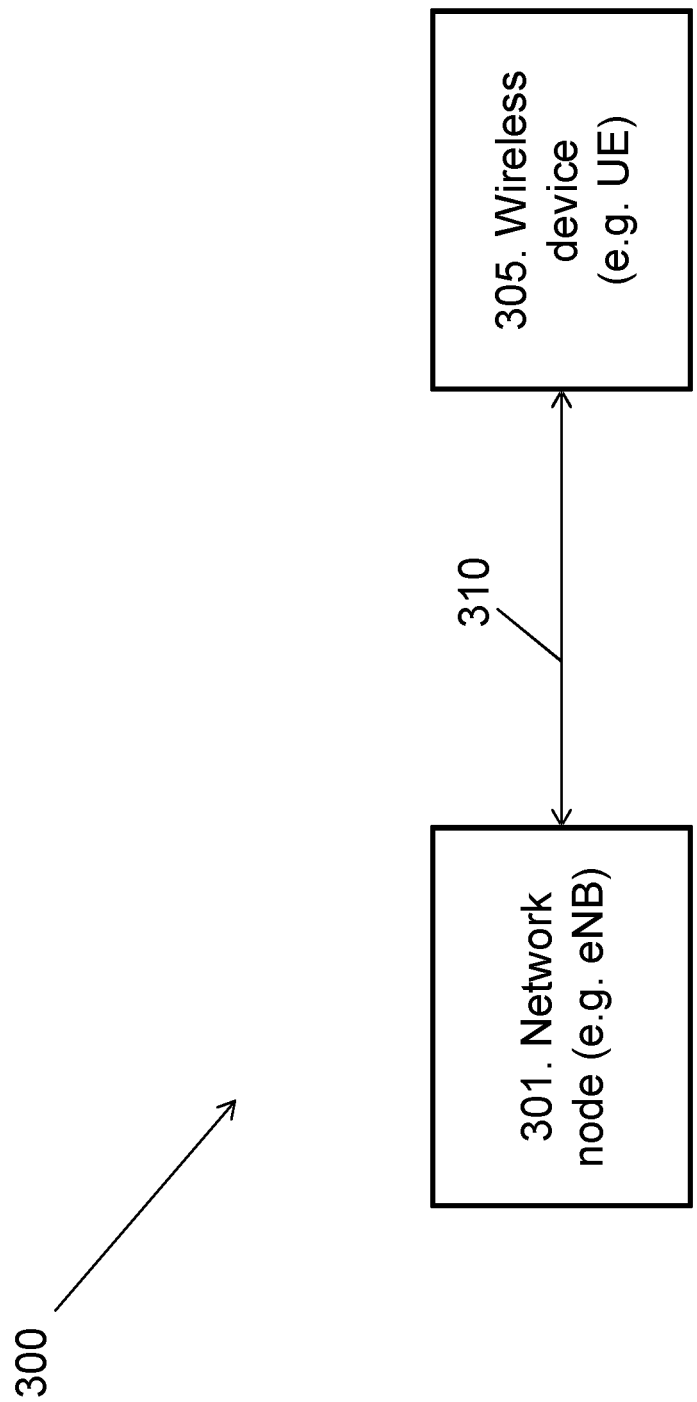
FIG. 3 is a schematic block diagram illustrating embodiments of a communications network.

FIG. 3 depicts a communications network 300 in which embodiments herein may be implemented. The communications network 300 may in some embodiments apply to one or more radio access technologies such as for example LTE, LTE Advanced, Wideband Code Division Multiple Access (WCDMA), Global System for Mobile Communications (GSM), any other 3GPP radio access technology or other radio access technologies such as e.g. Wireless Local Area Network (WLAN).

The communications network 300 comprises a network node 301. The network node 301 may be a base station, NodeB, Base Station Controller (BSC), eNodeB or any other network node capable to communicate with a wireless device 305 over a radio channel 310.

The wireless device 305 may be a device by which a subscriber may access services offered by an operator's network and services outside operator's network to which the operator's radio access network and core network provide access, e.g. access to the Internet. The wireless device 305 may be any device, mobile or stationary enabled to communicate over a radio channel in the communications network 300, for instance but not limited to e.g. user equipment, mobile phone, smart phone, sensors, meters, vehicles, household appliances, medical appliances, media players, cameras, M2M device or any type of consumer electronic, for instance but not limited to television, radio, lighting arrangements, tablet computer, laptop or PC. The wireless device 305 may be portable, pocket storable, hand held, computer comprised, or vehicle mounted devices, enabled to communicate voice and/or data, via the radio access network, with another entity, such as another wireless device or a server.

A method for handling scheduling of the wireless device 305 in the communications network 300 according to some embodiments will now be described with reference to the signaling diagram depicted in FIG. 4. The communications network 300 may be a Time Division Duplexing (TDD) network or a Frequency Division Duplexing (FDD) network. Duplexing is the process of achieving two-way communications over a communications channel. TDD uses a single frequency band for both transmit and receive. In FDD, the transmitter and receiver operate at different carrier frequencies. The network node 301 may be a base station and the wireless device 305 may be a user equipment. The method comprises the following steps, which steps may as well be carried out in another suitable order than described below.

Step 401

The network node 301 dynamically allocates non-consecutive subframes in which the network node is to transmit data to the wireless device 305 to or receive data from the wireless device 305. Seen from the perspective of the wireless device 305, the network node 301 dynamically allocates non-consecutive subframes in which the wireless device 305 is to receive data from the network node 301 or to transmit data to the network node 301.

Non-consecutive subframes are subframes which do not follow one another, i.e. they are in an interrupted sucession or order. For example, four non-consecutive subframes may be subframes 1, 3, 6 and 7. Consecutive subframes are subframes which follows one another in uninterrupted succession or order. For example four consecutive subframes may be subframes 1, 2, 3 and 4.

A downlink scheduling assignment for data transmission from the network node 301 to a wireless device 305 may be triggered by incoming data or higher layer control signaling intended for the wireless device 305. An uplink scheduling grant may be triggered by a reception of a data transmission request received from the wireless device 305.

This step 401 may also involve allocating consecutive subframes.

The non-consecutive subframes may be uplink non-consecutive subframes or downlink non-consecutive subframes, and the consecutive subframes may be uplink consecutive subframes or downlink consecutive subframes.

Dynamic allocation differentiates the embodiments herein from the semi persistent scheduling where a single subframe resource allocation is triggered to be persistently reoccurring with a specific periodicity until it is configured to stop. For SPS, the periodicity is semi-statically configured with RRC or MAC, but the on/off may be triggered dynamically. RRC is the Radio Resource Control protocol and handles control plane signalling of Layer 3 between the wireless device 305 and the radio access network. MAC is the Medium Access Control protocol which exists in the wireless device 305 and the base station.

Step 402

The network node 301 transmits a multi-TTI scheduling message to the wireless device 305 comprising information indicating the dynamically allocated non-consecutive subframes. The scheduling message may be a scheduling assignment for the downlink and/or a scheduling grant for the uplink. Based on the multi-TTI scheduling message the wireless device knows in which subframes it shall receive or transmit data to/from the network node 301.

In some embodiments, the information indicating the dynamically allocated non-consecutive subframes further indicates a multi-TTI subframe pattern corresponding to subframes where the wireless device 305 shall receive or transmit data.

In some embodiments, a reference point of the multi-TTI subframe pattern is at the subframe of reception of the message at the wireless device 305. In some embodiments, a reference point of the multi-TTI subframe pattern is determined based on radio frame timing.

In some embodiment, the multi-TTI scheduling message further comprises information indicating a number of "on" subframes or information indicating a number of consecutive subframes in an interval. This is related to the subframe pattern embodiment. The "on" subframes relate to the subframe pattern, where the "on" subframes are the subframes in which a transmission/reception of data may occur. The subframe pattern may thus indicate which subframes are "on", i.e. may be allocated, and which are "off", i.e. not to be allocated. If the subframe pattern is configured independently from the multi-TTI scheduling message, e.g. grant, then the actual multi-TTI scheduling message may indicate, for example, use the next five "on" subframes of the subframe pattern, or use the "on" subframes in the next five next consecutive subframes.

Also, note that a subframe pattern may be infinitely long, e.g., periodically repeating, and the multi-TTI scheduling assignment may comprise information for which duration of the subframe pattern, the allocation applies.

In some embodiments, the subframe pattern matches and is compatible to specific subframes in which the wireless device 305 is to be silent or in which the communication between the network node 301 and the wireless device 305 is prohibited.

In some embodiments, the wireless device 305 is configured with a plurality of candidate subframe patterns or the plurality of candidate subframe patterns is determined as part of a standard. The multi-TTI scheduling message may comprise an indicator to a specific subframe pattern of said plurality of subframe patterns. A plurality of candidate subframe patterns may comprise at least two subframe sets.

In some embodiments, the multi-TTI scheduling message comprises information indicating an uplink or downlink state of a flexible subframe. The subframe is flexible with regards to being an uplink or downlink subframe. Flexible subframes in TDD are subframes that may be used for uplink or downlink on a more or less dynamic basis. The multi-TTI scheduling grant may indicate to the wireless device 305 if it should expect a downlink reception, i.e., downlink state, or if it should perform an uplink transmission, i.e., uplink state, of a flexible subframe.

The multi-TTI scheduling message may be associated with non-flexible subframes.

Step 403

When the wireless device 305 receives the multi-TTI scheduling message it decodes the multi-TTI scheduling message, i.e. assignment or grant, interprets the information and behaves accordingly. That is, the wireless device 305 will encode uplink data/control and transmit (see step 404a) in the indicated dynamically allocated non-consecutive subframes if it receives an uplink multi-TTI scheduling grant, and it will receive (see step 404b) and decode data in the indicated dynamically allocated non-consecutive subframes if it receives a downlink multi-TTI scheduling assignment.

Step 404a

In some embodiments, the network node 301 transmits data to the wireless device 305 in the dynamically allocated non-consecutive subframes. This step is an alternative to step 404b, i.e. step 404b is not performed when step 404a is performed.

Step 404b

In some embodiments, the network node receives data from the wireless device 305 in the dynamically allocated non-consecutive subframes. This step is an alternative to step 404a, i.e. step 404a is not performed when step 404b is performed.

The embodiments herein relate to e.g. LTE, small cells, physical resource block (PRB) Bundling, Physical Resource Group (PRG), SPS and multi-TTI scheduling. PRG is a combination of a number of PRBs. In a small cells scenario, there is a possibility to have bursty traffic and it is therefore a possibility to better use the multi-TTI scheduling feature. Bursty traffic implies occasional user equipments, i.e. less frequent than in large cells cases.

In one embodiment, the dynamic multi-TTI scheduling message, e.g. part of the DCI format message, may indicate a set of subframes that are not all consecutive in time.

In one embodiment, the multi-TTI scheduling message sent by the network node 301 indicates, implicitly or explicitly, a bitmap where each bit corresponds to a specific subframe being assigned/granted or not. Such a bitmap may be a cyclically repeating pattern, in which case only one period needs to be explicitly indicated.

In another embodiment, the indication involves explicit subframe patterns corresponding to subframes where the wireless device 305 or the network node 301 shall receive/transmit data associated with a multi-TTI scheduling message. For example, these patterns may correspond to: every other subframe, every third subframe, two out of three subframes, and so on. In a specific case of the embodiment, the periodicity of the multi-TTI scheduling message follows the periodicity given by a Hybrid Automatic Repeat reQuest (HARQ) process. In such a case it may be viewed as the multi-TTI assignment is assigned to a given HARQ process in either uplink or downlink. The periodicity may be different in TDD compared to FDD and particular within TDD depending on the assigned uplink/downlink configuration or uplink/downlink reference configuration. This as the amount of HARQ processes differs between the different examples. For downlink scheduling the assumption may be that a following downlink assignment is assigned with the assumption of a delay of minimum four subframes between HARQ feedback and the following downlink assignment. In FDD, i.e. Frame Structure 1, the delay is 4 ms, for a TDD system (Frame Structure 2) the exact amount of subframes depends on the TDD uplink/downlink configuration and which downlink subframe is assumed.

In one embodiment, the indicated multi-TTI subframe pattern has a reference point, i.e. starting point, at the subframe of the reception of the assignment/grant at the wireless device 305. In another embodiment, the reference point of the subframe pattern is determined from the radio frame timing, independently from the timing of the reception of the multi-TTI scheduling grant at the wireless device 305.

The multi-TTI scheduling grant may further indicate a number of "on" subframes, of a subframe pattern, that are assigned. Alternatively, the multi-TTI scheduling message may indicate the number of consecutive subframes to be considered in an interval, and the wireless device 305 is assigned/granted the "on" subframes, of the subframe pattern, in this interval, which may be non-consecutive.

The first allocation type indicates the number of "on" frames to be used. And the second allocation type indicates the number of subframes, in which the wireless device 305 is allocated the "on" subframes.

For example, the wireless device 305 receives a subframe pattern classifying a subframe as 'X' (can be used), or as '-' (cannot be used).

Allocation type 1: Use the next three subframes of the subframe pattern.

Allocation type 2: Use the subframes of the next three subframes that have been indicated in the subframe pattern.

The two allocation types will the result in the following outcome, seen in table 1:

TABLE 1

| Subframe number: | 1 | 2 | 3 | 4 | 5 |
|---|---|---|---|---|---|
| Subframe pattern | X | — | X | — | X |
| Allocation type 1 (t for transmit and s for silent) | t | s | t | s | t |
| Allocation type 2 (t for transmit and s for silent) | t | s | t | s | s |

In a combined specific embodiment of the above embodiments the subframe wherein the wireless device 305 is expecting a downlink assignment or has an uplink grant for the N:th assignment is given by:

(10*SFN+subframe)=[(10*SFNstart time+subframestart time)+$N$*multiTTIInterval] modulo 10240

Where the parameters SFNstart time and subframestart time are the System Frame Number (SFN) and subframe, respectively, at the time the configured downlink assignment or uplink grant were (re-)initialized, or is given as a starting value by a predefined signals that may for example be done by RRC signaling, MAC signaling or a DCI message.

Each frame may be identified with a SFN and is used to control different transmission cycles that may have a period longer than one frame. RRC is a protocol that handles control plane signaling between the wireless device 305 and the radio access network. MAC signaling is part of the MAC sub-layer.

The number 10 is used in the above equation because a radio frame comprises 10 subframes. modulo 10240 in the above equation is associated with the number of radio frames in a superframe.

The parameter multiTTIInterval gives the periodicity of the multi-TTI assigned or granted resources. In one embodiment the assignment or grant is only valid for a certain amount of subframes N_max, i.e. the multi-TTI scheduling message is only valid for N<N_max occasions, where N and N_max are positive integeres. The number of occasions may count all occasions given by the equation above or only the occasions wherein the wireless device 305 received data or transmitted data.

In a further embodiment, a retransmission of transport block(s) may occur at the next occasion of the multi-TTI scheduling message. Alternatively it may also be possible for the network node 301 to separately schedule retransmissions of transmission blocks both in uplink and downlink.

For these embodiments, the subframe pattern may either be dynamically signalled as part of a DCI message for the multi-TTI scheduling message. Alternatively, it may be semi-statically configurable by RRC or MAC, in which case they may be shared by all multi-TTI scheduling messages.

Alternatively, a number of candidate subframe patterns are indicated to the wireless device 305 by RRC or MAC, and a DCI format indicates which one of these candidate patterns to apply for the specific assignment/grant.

Multi-TTI Scheduling in Combination with eICIC

In another embodiment, the multi-TTI scheduling grant is applied for a transmission to/from the network node 301 to the wireless device 305 where it should be silent in specific subframes, or in specific subrames where communication is prohibited. This may be indicated by a bitmap or implicitly induced by other parameters. An example of such operation is eICIC where e.g., transmissions from a macro node should be muted on a grid of Almost Blank Subframes (ABS). Similarly, the wireless device 305 in the cell range expansion zone cannot receive data from an interfered pico node in non-ABS subframes, because the macro node interference blocks the reception. From a wireless device 305 perspective, the ABS pattern and non-ABS pattern are configured in terms of two subframe sets, which in Release 11 of LTE affects Channel State Information (CSI) reporting, e.g., the interference measurements are performed independently for the two different subframe sets. One of the subframe sets corresponds to an ABS patterns and the other to a non-ABS pattern.

eICIC was introduced in 3GPP release 10 to handle inter-cell interference in heterogeneous networks. eICIC uses power, frequency and time domain to mitigate intra-frequency interference in such networks. The ABS was introduced in eICIC.

In one embodiment, the subframe pattern applicable for a multi-TTI scheduling message coincides with a configured subframe set.

Multi-TTI Scheduling in Combination with TDD

In one embodiment, the multi-TTI scheduling assignment or grant only applies to downlink or uplink subframes in a TDD system. In one such embodiment, an allocation/grant for X subframes refers to X downlink subframes or X uplink subframes, where X is a positive integer. In another such embodiment, the allocation refers to X consecutive subframes, but reception/transmission is only performed on subframes with the correct uplink/downlink state.

The embodiments herein may also be applied in a communications network employing flexible TDD, where a portion of the subframes of for example a radio frame may be defined as flexible subframes, which are either allocated for downlink or uplink based on instantaneous traffic situations at the network node 301. In one embodiment, the multi-TTI scheduling grant may be combined with flexible subframe usage. In one such embodiment, the state of the uplink/downlink flexible subframes is signaled as part of or along with the multi-TTI scheduling message. In another embodiment, the multi-TTI scheduling message is only applied in non-flexible subframes, whereas dynamic single-TTI scheduling message are utilized to allocate uplink or downlink transmissions in flexible subframes.

In another embodiment, the multi-TTI scheduling message is limited or indicated to be limited to subframes that are uplink or downlink for all TDD configurations. In another embodiment the multi-TTI scheduling message is limited to subframes that are uplink or downlink in both of a current TDD configuration and a target candidate TDD configuration. This has the advantage that the TDD configuration may be changed without conflicting with a current multi-TTI scheduling message.

Figure 5:
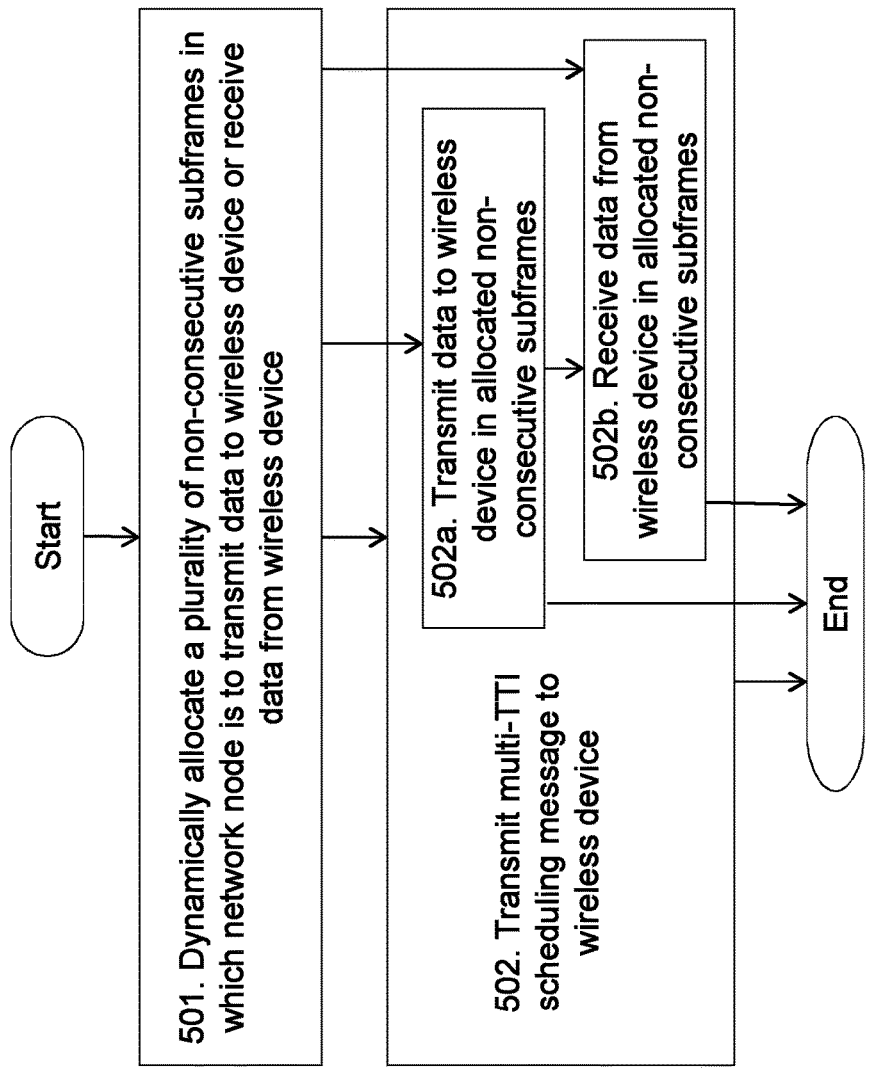
FIG. 5 is a flow chart illustrating embodiments of a method in a network node.

The method described above will now be described seen from the perspective of the network node 301. FIG. 5 is a flowchart describing the present method in the network node 301 for handling scheduling of the wireless device 305 in the communications network 300. As mentioned above, the network node 301 is adapted to communicate with the wireless device 305 over the radio channel 310. The communications network 300 may be a TDD network or a FDD network. The network node 301 may be a base station and the wireless device 305 may be a user equipment. The method comprises the following steps to be performed by the network node 301, which steps may be performed in any suitable order:

Step 501

Figure 4:
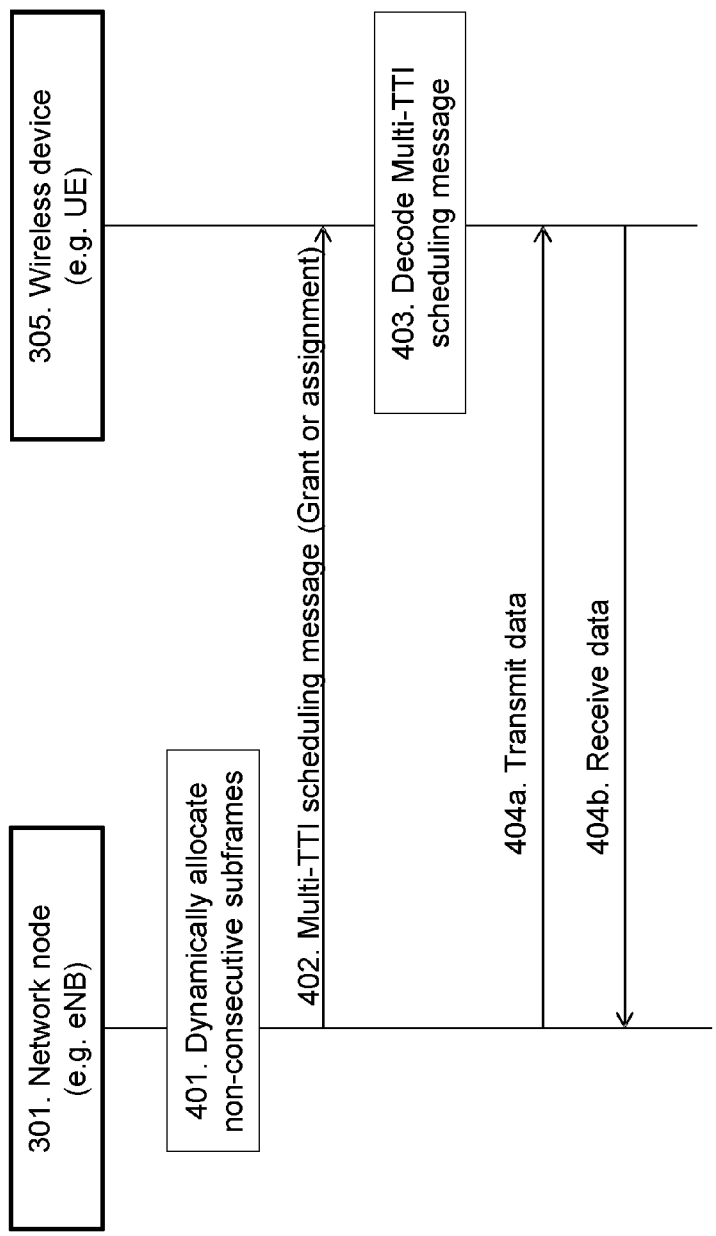
FIG. 4 is a signaling diagram illustrating embodiments of a method in the communications network.

This step corresponds to step 401 in FIG. 4.

The network node 301 dynamically allocates a set of non-consecutive subframes in which the network node 301 is to transmit data to the wireless device 305 or receive data from the wireless device 305.

Step 502

This step corresponds to step 402 in FIG. 4.

The network node 301 transmits the multi-TTI scheduling message to the wireless device 305. The multi-TTI scheduling message comprises information indicating the dynamically allocated non-consecutive subframes.

The multi-TTI scheduling message may be at least one of a multi-TTI scheduling assignment for a downlink direction and a multi-TTI scheduling grant for an uplink direction.

In some embodiments, the information indicating the dynamically allocated non-consecutive subframes further indicates a multi-TTI subframe pattern corresponding to non-consecutive subframes where the network node 305 shall receive data from the wireless device 305 or transmit data to the wireless device 305. The subframe pattern may match subframes in which the wireless device 305 is to be silent or the subframe pattern may match subframes in which communication between the network node 301 and the wireless device 305 is prohibited. In some embodiments, the wireless device 305 is configured with a plurality of candidate subframe patterns, and the multi-TTI scheduling message comprises an indicator to a specific subframe pattern of said plurality of candidate subframe patterns.

In some embodiments, a reference point of the multi-TTI subframe pattern is at a subframe in which the multi-TTI scheduling message is received at the wireless device 305. In some embodiments, the reference point of the multi-TTI subframe pattern is determined based on radio frame timing.

The multi-TTI scheduling message may further comprise information indicating a number of on subframes or information indicating a number of consecutive subframes associated with a time interval.

The multi-TTI scheduling message may comprise information indicating an uplink state or a downlink state of a flexible subframe. The subframe may be flexible with regards to being an uplink or downlink subframe. In some embodiments, the multi-TTI scheduling message is associated with non-flexible subframes.

Step 502*a*

This step corresponds to step 404*a* in FIG. 4.

In some embodiments, the network node 301 transmits data to the wireless device 305 in the dynamically allocated non-consecutive subframes. This step 502*a* is an alternative to step 502*b* below.

Step 502*b*

This step corresponds to step 404*b* in FIG. 4.

In some embodiments, the network node 301 receives data from the wireless device 305 in the dynamically allocated non-consecutive subframes. This step 502*b* is an alternative to step 502*a* above.

Figure 6:
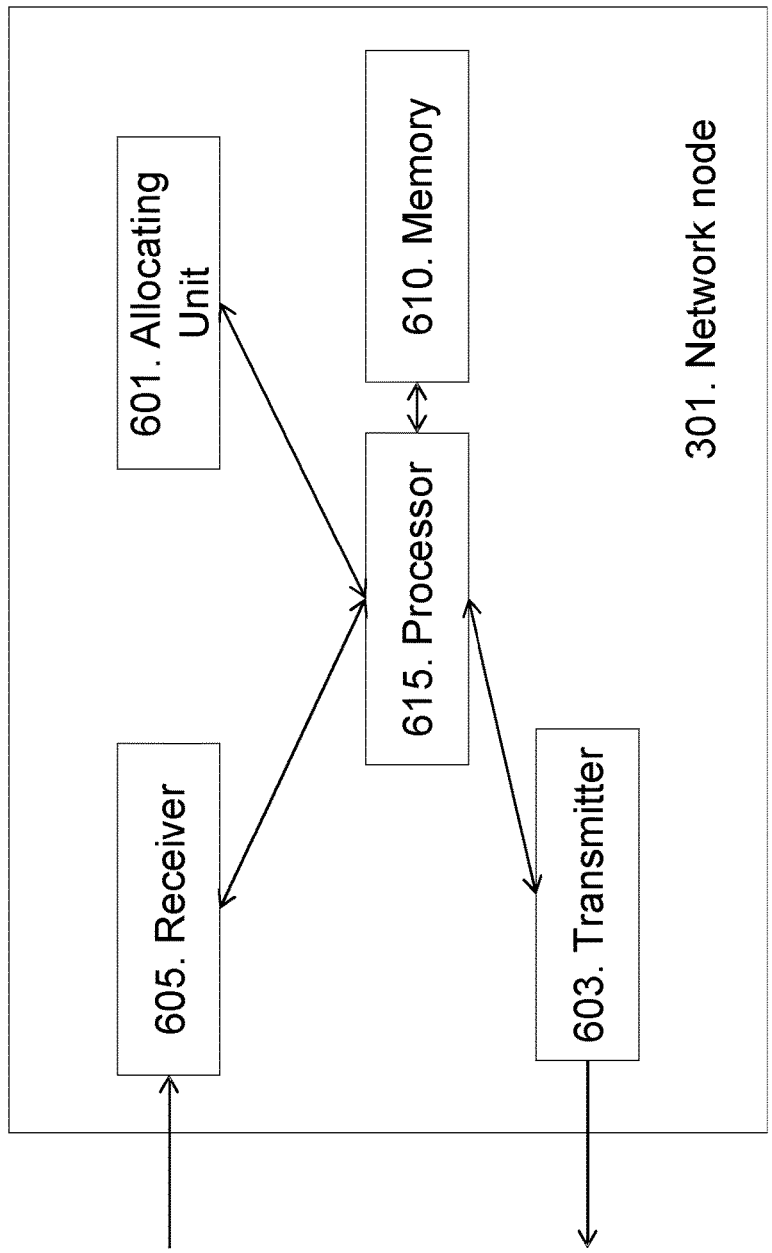
FIG. 6 is a schematic block diagram illustrating embodiments of a network node.

To perform the method steps shown in FIGS. 4 and 5 for handling scheduling of the wireless device 305 in a communications network 300, the network node 301 comprises an arrangement shown in FIG. 6. As mentioned above, the network node 301 is adapted to communicate with the wireless device 305 over the radio channel 310. The communications network 300 may be a TDD network or a FDD network. The network node 301 may be a base station and the wireless device 305 may be a user equipment.

The network node 301 comprises an allocating unit 601 which is adapted to dynamically allocate a set of non-consecutive subframes in which the network node 301 is to transmit data to the wireless device 305 or receive data from the wireless device 305.

The network node 301 comprises a transmitter 603 which is adapted to transmit a multi-TTI scheduling message to the wireless device 305. The multi-TTI scheduling message comprises information indicating the dynamically allocated non-consecutive subframes. The transmitter 605 may be further adapted to transmit data to the wireless device 305 in the dynamically allocated non-consecutive subframes. In some embodiments, the multi-TTI scheduling message is at least one of a multi-TTI scheduling assignment for a downlink direction and a multi-TTI scheduling grant for an uplink direction. The information indicating the dynamically allocated non-consecutive subframes may further indicate a multi-TTI subframe pattern corresponding to non-consecutive subframes where the network node 305 shall receive data from the wireless device 305 or transmit data to the wireless device 305.

In some embodiments, a reference point of the multi-TTI subframe pattern is at a subframe in which the multi-TTI scheduling message is received at the wireless device 305, or the reference point of the multi-TTI subframe pattern is determined based on radio frame timing. In some embodiments, the multi-TTI scheduling message further comprises information indicating a number of "on" subframes or information indicating a number of consecutive subframes associated with a time interval. In some embodiments, the subframe pattern matches subframes in which the wireless device 305 is to be silent, or the subframe pattern matches subframes in which communication between the network node 301 and the wireless device 305 is prohibited. In some embodiments, the wireless device 305 is configured with a plurality of candidate subframe patterns. The multi-TTI scheduling message may comprise an indicator to a specific subframe pattern of said plurality of candidate subframe patterns.

In some embodiments, the network node 301 further comprises a receiver 605 which is adapted to receive data from the wireless device 305 in the dynamically allocated non-consecutive subframes. In some embodiments, the multi-TTI scheduling message comprises information indicating an uplink state or a downlink state of a flexible subframe, and wherein the subframe is flexible with regards to being an uplink or downlink subframe. In some embodiments, the multi-TTI scheduling message is associated with non-flexible subframes.

The network node 301 may further comprise a memory 610 comprising one or more memory units. The memory 610 is arranged to be used to store data, received data streams, power level measurements, threshold values, time periods, configurations, multi-TTI scheduling messages, i.e. assignments and/or grants, schedulings, consecutive and non-consecutive subframes, subframe pattern, reference point, number of subframes, parameters, downlink and uplink information, TDD and FDD information, scheduling assignment/grant, and applications to perform the methods herein when being executed in the network node 301.

Those skilled in the art will also appreciate that the receiver 605, the allocating unit 601 and the transmitter 603 described above may refer to a combination of analog and digital circuits, and/or one or more processors configured with software and/or firmware, e.g. stored in the memory 610, that when executed by the one or more processors such as a processor 615 performing as described below.

Figure 7:
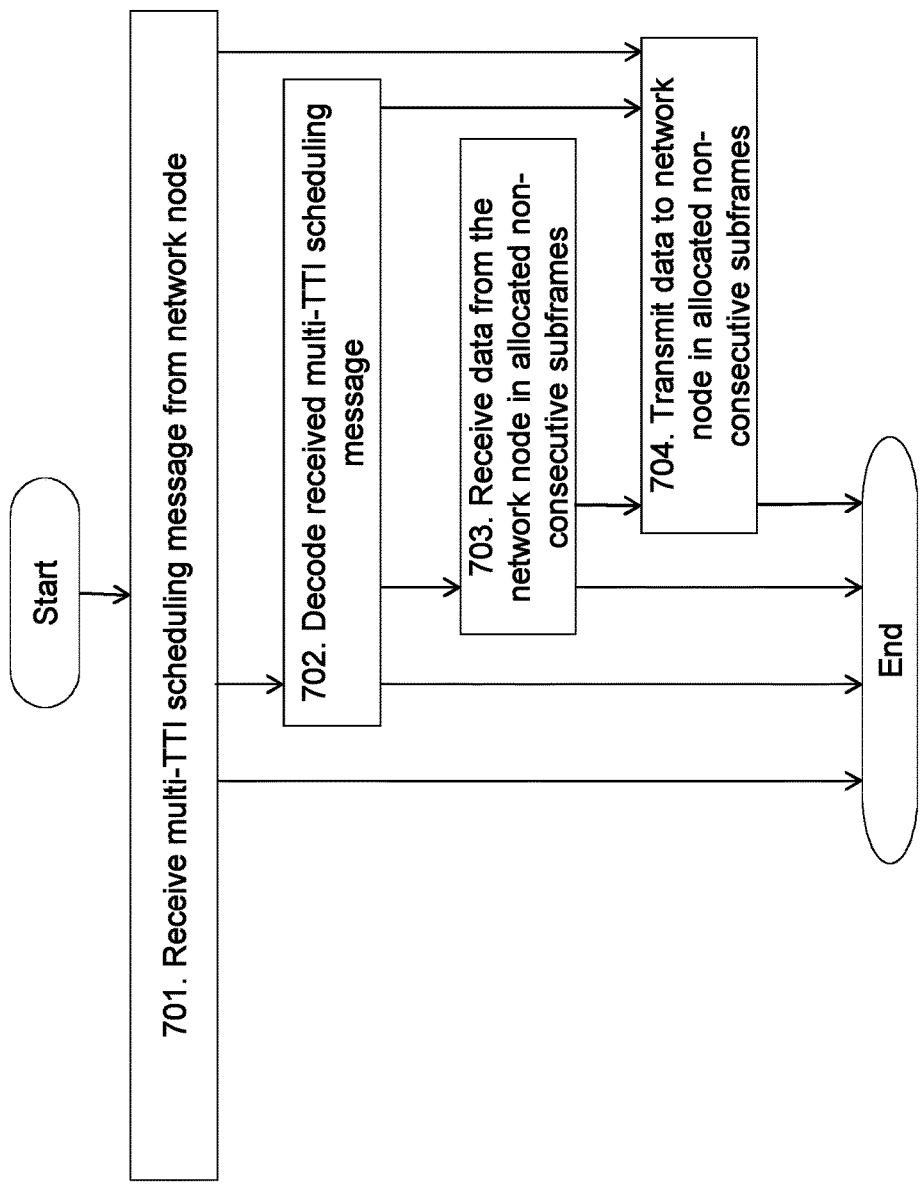
FIG. 7 is a flow chart illustrating embodiments of a method in a wireless device.

The method described above will now be described seen from the perspective of the wireless device 305. FIG. 7 is a flowchart describing the present method in the wireless device 305 for handling scheduling of the wireless device 305 in the communications network 300. As mentioned above, the wireless device 305 is adapted to communicate with the network node 301 over the radio channel 310. The network node 301 may be a base station and the wireless device 305 may be a user equipment. The communications network 300 may be a TDD network or a FDD network. The method comprises the following steps to be performed by the wireless device 305, which steps may be performed in any suitable order than described below:

Step 701

This step corresponds to step 402 in FIG. 4.

The wireless device 305 receives a multi-TTI scheduling message from the network node 301. The multi-TTI scheduling message comprises information indicating a set of dynamically allocated non-consecutive subframes in which the wireless device 305 is to transmit data to the network node 301 or to receive data from the network node 301.

The multi-TTI scheduling message may be at least one of a multi-TTI scheduling assignment for a downlink direction and a multi-TTI scheduling grant for an uplink direction.

In some embodiments, the information indicating the dynamically allocated non-consecutive subframes further indicates a multi-TTI subframe pattern corresponding to subframes in which the wireless device 305 shall receive data from the network node 301 or transmit data to the network node 301.

In some embodiments, the reference point of the multi-TTI subframe pattern is a subframe in which the multi-TTI scheduling message is received at the wireless device 305, or the reference point of the multi-TTI subframe pattern is determined based on radio frame timing.

The multi-TTI scheduling message may further comprise information indicating a number of "on" subframes or information indicating a number of consecutive subframes associated with a time interval.

The subframe pattern may match subframes in which the wireless device 305 is to be silent, or the subframe pattern may match subframes in which the communication between the network node 301 and the wireless device 305 is prohibited.

In some embodiments, the wireless device 305 is configured with a plurality of candidate subframe patterns. The multi-TTI scheduling message may comprise an indicator to a specific subframe pattern of said plurality of subframe patterns.

In some embodiments, the multi-TTI scheduling message comprises information indicating an uplink state or downlink state of a flexible subframe. The subframe may be flexible with regards to being an uplink or downlink subframe.

The multi-TTI scheduling message may be associated with non-flexible subframes.

Step 702

This step corresponds to step 403 in FIG. 4.

In some embodiments, the wireless device 305 decodes the received multi-TTI scheduling message.

Step 703

This step corresponds to step 403a in FIG. 4.

In some embodiments, the wireless device 305 receives data from the network node 301 in the dynamically allocated non-consecutive subframes.

Step 704

This step corresponds to step 403b in FIG. 4.

In some embodiments, the wireless device 305 transmits data to the network node 301 in the dynamically allocated non-consecutive subframes.

Figure 8:
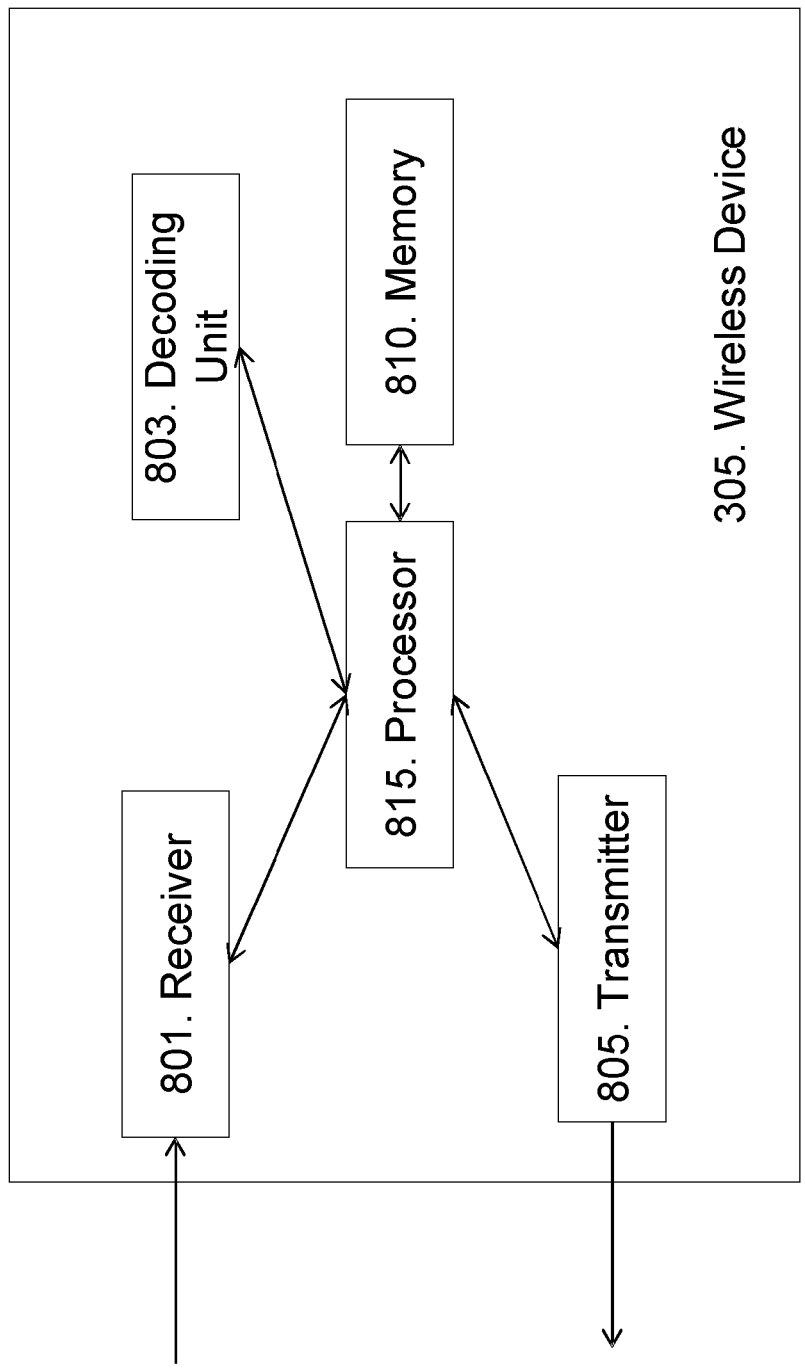
FIG. 8 is a schematic block diagram illustrating embodiments of a network node.

To perform the method steps shown in FIG. 7 for handling scheduling of the wireless device in the communications network 300, the wireless device 305 comprises an arrangement shown in FIG. 8. As mentioned above, the wireless device 305 is adapted to communicate with the network node 301 over the radio channel 310. The communications network 300 may be a TDD network or a FDD network. The network node 301 may be a base station and the wireless device 305 may be a user equipment.

The wireless device 305 comprises a receiver 801 which is adapted to receive a multi-TTI scheduling message from the network node 301. The multi-TTI scheduling message comprises information indicating a set of dynamically allocated non-consecutive subframes in which the wireless device 305 is to transmit data to the network node 301 or to receive data from the network node 301. The receiver 801 may be further adapted to receive data from the network node 301 in the dynamically allocated non-consecutive subframes.

The wireless device 305 may further comprise a decoding unit 803 adapted to decode the received multi-TTI scheduling message.

In some embodiments, the wireless device 305 comprises a transmitter 805 which is adapted to transmit data to the network node 301 in the dynamically allocated non-consecutive subframes.

The multi-TTI scheduling message may be at least one of a multi-TTI scheduling assignment for a downlink direction and a multi-TTI scheduling grant for an uplink direction.

The information indicating the dynamically allocated non-consecutive subframes may further indicate a multi-TTI subframe pattern corresponding to subframes in which the wireless device 305 shall receive data from the network node 301 or transmit data to the network node 301.

In some embodiments, a reference point of the multi-TTI subframe pattern is a subframe in which the multi-TTI scheduling message is received at the wireless device 305, or the reference point of the multi-TTI subframe pattern is determined based on radio frame timing.

The multi-TTI scheduling message may further comprise information indicating a number of "on" subframes or information indicating a number of consecutive subframes associated with a time interval.

In some embodiments, the subframe pattern matches subframes in which the wireless device 305 is to be silent, or the subframe pattern matches subframes in which the communication between the network node 301 and the wireless device 305 is prohibited.

The wireless device 305 may be configured with a plurality of candidate subframe patterns, and the multi-TTI scheduling message may comprise an indicator to a specific subframe pattern of said plurality of subframe patterns.

In some embodiments, the multi-TTI scheduling message comprises information indicating an uplink state or downlink state of a flexible subframe, and the subframe is flexible with regards to being an uplink or downlink subframe. In some embodiments, the multi-TTI scheduling message is associated with non-flexible subframes.

The wireless device 305 may further comprise a memory 810 comprising one or more memory units. The memory 810 is arranged to be used to store data, received data streams, power level measurements, threshold values, time periods, configurations, multi-TTI scheduling messages, schedulings, consecutive and non-consecutive subframes, subframe pattern, reference point, number of subframes, parameters, downlink and uplink information, TDD and FDD information, scheduling assignment/grant, and applications to perform the methods herein when being executed in the wireless device 305.

Those skilled in the art will also appreciate that the receiver 801, the decoding unit 803 and the transmitter 805 described above may refer to a combination of analog and digital circuits, and/or one or more processors configured with software and/or firmware, e.g. stored in the memory 810, that when executed by the one or more processors such as the processor 815 performing as described below.

The present mechanism for scheduling the wireless device 305 may be implemented through one or more processors, such as the processor 615 in the network node arrangement depicted in FIG. 6 and the processor 815 in the wireless device arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the network node 301 and/or wireless device 305. One such carrier may be in the form of a CD ROM disc. It is however feasible with other data carriers such as a memory stick. The computer program code may furthermore be provided as pure program code on a server and downloaded to the network node 301 and/or wireless device 305.

The example communications network 300 in FIG. 3 may further comprise any additional elements suitable to support communication between wireless devices or between a wireless device and another communication device, such as a landline telephone. Although the illustrated wireless device 301 may represent a communication device that comprises any suitable combination of hardware and/or software, this wireless device may, in particular embodiments, represent a device such as the example wireless device 301 illustrated in greater detail by FIG. 9. Similarly, although the illustrated network nodes may represent network nodes that comprises any suitable combination of hardware and/or software, these network nodes may, in particular embodiments, represent devices such as the example network node 305 illustrated in greater detail by FIG. 10.

Figure 9:
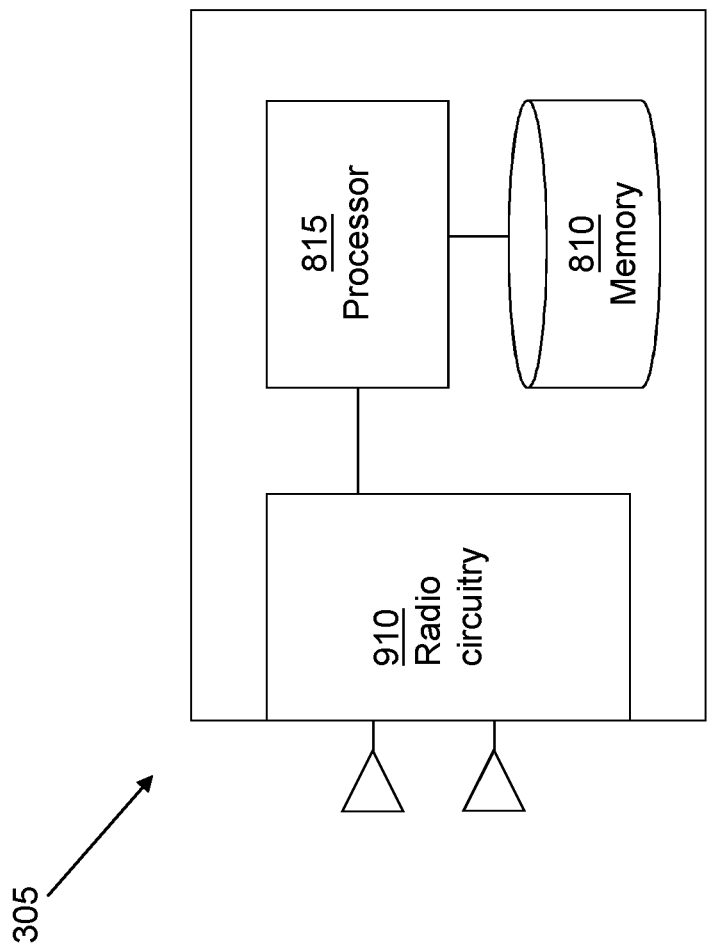
FIG. 9 is a schematic block diagram illustrating embodiments of a wireless device.

As shown in FIG. 9, the example wireless device 305 comprises the processor 815, the memory 810, radio circuitry 910, and at least one antenna. The radio circuitry 910 may comprise RF circuitry and baseband processing circuitry (not shown). In particular embodiments, some or all of the functionality described above as being provided by mobile communication devices or other forms of wireless device may be provided by the processor 815 executing instructions stored on a computer-readable medium, such as the memory 810 shown in FIGS. 8 and 9. Alternative embodiments of the wireless device 305 may comprise additional components beyond those shown in FIG. 9 that may be responsible for providing certain aspects of the wireless device's functionality, comprising any of the functionality described above and/or any functionality necessary to support the solution described above.

Figure 10:
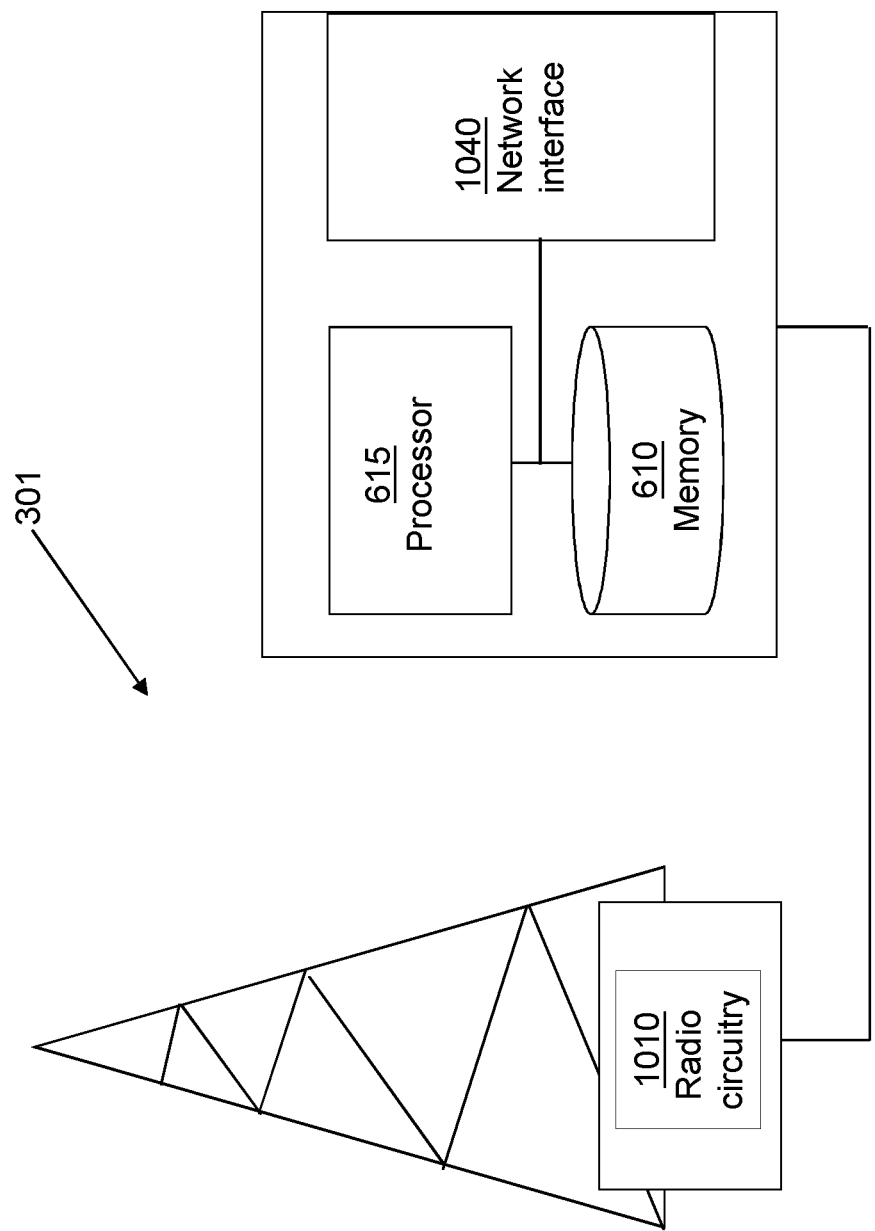
FIG. 10 is a schematic block diagram illustrating embodiments of a network node.

As shown in FIG. 10, the example network node 301 comprises the processor 615, the memory 610, radio circuitry 1010, network interface 1040 and at least one antenna. The processor 615 may comprise RF circuitry and baseband processing circuitry (not shown). In particular embodiments, some or all of the functionality described above as being provided by a mobile base station, a base station controller, a relay node, a NodeB, an eNodeB, and/or any other type of mobile communications node may be provided by the processor 615 executing instructions stored on a computer-readable medium, such as the memory 610 shown in FIGS. 6 and 10. Alternative embodiments of the network node 301 may comprise additional components responsible for providing additional functionality, comprising any of the functionality identified above and/or any functionality necessary to support the solution described above.

The embodiments herein relate to multi-TTI scheduling messages comprising dynamic allocation of a set of non-consecutive subframes in time. The multi-TTI scheduling messages may be multi-TTI scheduling assignments or grants. By a set of non-consecutive subframes, throughout this disclosure, it is referred to a set of subframes that may be partitioned into at least two non-overlapping groups of consecutive subframes, which are separated by at least one subframe.

Such scheduling assignments/grants have many advantages, comprising enabling interleaving multiple wireless devices in time, rather than in frequency. This is more battery efficient, since the wireless device may sleep in the subframes that are free of data, and receive at "full" rate in TTIs that are allocated. That is, the radio "on" time is minimized.

Moreover, the embodiments herein allows for effective use of multi-TTI assignments/grants in systems where all subframes are not suitable for transmission/reception, such as systems employing eICIC.

Scheduling assignments/grants involving multiple TTIs (subframes) have the advantage of reduced scheduling assignment/grant signaling overhead, but comes at the cost of reduced dynamic scheduling flexibility. The embodiments herein alleviate such scheduling restrictions.

The embodiments herein allow for dynamic multi-TTI assignments/grants on specific (non-consecutive) subframes, which allows for time multiplexing of wireless devices, which improves the wireless device power utilization since the radio "on" time is minimized.

Moreover, the embodiments herein allow respecting transmission constraints where some subframes are unsuitable for transmission, which may be the case in, for example, systems employing eICIC, i.e. cell range expansion, or in interference coordination systems, where the transmissions from multiple transmission points are coordinated as to avoid interference collisions.

The embodiments herein are not limited to the features and advantages mentioned above. A person skilled in the art will recognize additional features and advantages upon reading the above detailed description.

Note that although terminology from 3GPP LTE has been used in this disclosure to exemplify the embodiments herein, this should not be seen as a limitation to only the aforementioned communications network. Other communications networks, comprising WCDMA, Worldwide Interoperability for Microwave Access (WiMax), Ultra Mobile Broadband (UMB) and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel, e.g. the radio channel 310. Herein, the focus is on wireless transmissions in the downlink, but the embodiments herein are equally applicable in the uplink.

In the above, the embodiments herein are illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

The embodiments herein are not limited to the above described embodiments. Various alternatives, modifications and equivalents may be used. Therefore, the above embodiments should not be taken as limiting the scope of the embodiments herein.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to" or "adapted to".

It should also be emphasised that the steps of the methods defined in the appended claims may, without departing from the embodiments herein, be performed in another order than the order in which they appear.

The invention claimed is:

1. A method, in a network node, for handling scheduling of a wireless device in a communications network, wherein the network node is adapted to communicate with the wireless device over a radio channel, the method comprising:

dynamically allocating a set of non-consecutive subframes in which the network node is to transmit data to the wireless device or receive data from the wireless device; and transmitting, in a downlink control information message (DCI) on a physical downlink control channel (PDCCH), a multi-Time Transmission Interval (TTI) scheduling message to the wireless device, which multi-TTI scheduling message comprises information indicating the dynamically allocated non-consecutive subframes;

wherein the information indicating the dynamically allocated non-consecutive subframes further indicates a multi-TTI subframe pattern corresponding to non-consecutive subframes where the network node is to receive data from the wireless device or transmit data to the wireless device such that the multi-TTI subframe pattern indicates which subframes are on and to be allocated and which subframes are off and not to be allocated;

wherein the multi-TTI scheduling message further comprises information indicating a number of subframes that are on, or information indicating a number of consecutive subframes associated with a time interval; and transmitting, by the network node in a radio resource control (RRC) message or a medium access control (MAC) message, to the wireless device, an indication of a number of candidate multi-TTI subframe patterns, wherein the downlink control information message transmitted on the physical downlink control channel indicates which one of the candidate multi-TTI subframe patterns is the multi-TTI subframe pattern.

2. The method of claim 1, further comprising at least one of:

transmitting data to the wireless device in the dynamically allocated non-consecutive subframes; and receiving data from the wireless device in the dynamically allocated non-consecutive subframes.

3. The method of claim 1, wherein the multi-TTI scheduling message is at least one of:

a multi-TTI scheduling assignment for a downlink direction; and a multi-TTI scheduling grant for an uplink direction.

4. The method of claim 1:

wherein a reference point of the multi-TTI subframe pattern is at a subframe in which the multi-TTI scheduling message is received at the wireless device; or wherein the reference point of the multi-TTI subframe pattern is determined based on radio frame timing.

5. The method of claim 1:

wherein the subframe pattern matches subframes in which the wireless device is configured to be silent; or wherein the subframe pattern matches subframes in which communication between the network node and the wireless device is prohibited.

6. The method of claim 1, wherein:

the wireless device is configured with a plurality of candidate subframe patterns; and the multi-TTI scheduling message comprises an indicator to a specific subframe pattern from the plurality of candidate subframe patterns.

7. The method of claim 1, wherein the communications network is a Time-Division Duplexing (TDD) network or a Frequency-Division Duplexing (FDD) network.

8. The method of claim 1, wherein:
the subframe is flexible with regards to being an uplink or downlink subframe; and
the multi-TTI scheduling message comprises information indicating an uplink state or a downlink state of a flexible subframe.

9. The method of claim 1, wherein the multi-TTI scheduling message links non-flexible subframes.

10. The method of claim 1, wherein the network node is a base station and the wireless device is a user equipment.

11. A method, in a wireless device, for handling scheduling of the wireless device in a communications network, wherein the wireless device is adapted to communicate with a network node over a radio channel, the method comprising:
receiving, by the wireless device in a downlink control information (DCI) message on a physical downlink control channel (PDCCH), a multi-Time Transmission Interval (TTI) scheduling message from the network node, the multi-TTI scheduling message comprising:
information indicating a set of dynamically allocated non-consecutive subframes in which the wireless device is to transmit data to the network node or to receive data from the network node;
information indicating a multi-TTI subframe pattern corresponding to subframes in which the wireless device shall receive data from the network node or transmit data to the network node; and
the multi-TTI subframe pattern indicating which subframes are on and may be allocated and which subframes are off and not to be allocated; and
wherein the multi-TTI scheduling message further comprises information indicating a number of on subframes or information indicating a number of consecutive subframes associated with a time interval; and
receiving, by the wireless device in a radio resource control (RRC) message or a medium access control (MAC) message, from the network node, an indication of a number of candidate multi-TTI subframe patterns, wherein the downlink control information message transmitted on the physical downlink control channel indicates which one of the candidate multi-TTI subframe patterns is the multi-TTI subframe pattern.

12. The method of claim 11, further comprising decoding the received multi-TTI scheduling message.

13. The method of claim 11, further comprising at least one of:
receiving data from the network node in the dynamically allocated non-consecutive subframes; and
transmitting data to the network node in the dynamically allocated non-consecutive subframes.

14. The method of claim 11, wherein the multi-TTI scheduling message is at least one of:
a multi-TTI scheduling assignment for a downlink direction; and
a multi-TTI scheduling grant for an uplink direction.

15. The method of claim 11:
wherein a reference point of the multi-TTI subframe pattern is a subframe in which the multi-TTI scheduling message is received at the wireless device; or
wherein the reference point of the multi-TTI subframe pattern is determined based on radio frame timing.

16. The method of claim 11:
wherein the subframe pattern matches subframes in which the wireless device is configured to be silent; or
wherein the subframe pattern matches subframes in which the communication between the network node and the wireless device is prohibited.

17. The method of claim 11, wherein:
the wireless device is configured with a plurality of candidate subframe patterns; and
the multi-TTI scheduling message comprises an indicator to a specific subframe pattern of the plurality of subframe patterns.

18. The method of claim 11, wherein the communications network is a Time-Division Duplexing (TDD) network or a Frequency-Division Duplexing (FDD) network.

19. The method of claim 11:
wherein the subframe is flexible with regards to being an uplink or downlink subframe; and
wherein the multi-TTI scheduling message comprises information indicating an uplink state or downlink state of a flexible subframe.

20. The method of claim 11, wherein the multi-TTI scheduling message is associated with non-flexible subframes.

21. The method of claim 11, wherein the network node is a base station and the wireless device is a user equipment.

22. A network node for handling scheduling of a wireless device in a communications network, wherein the network node is adapted to communicate with the wireless device over a radio channel, the network node comprising:
an allocating circuit adapted to dynamically allocate a set of non-consecutive subframes, in which the network node is to transmit data to the wireless device or to receive data from the wireless device; and
a transmitter adapted to:
transmit, in a downlink control information (DCI) message on a physical downlink control channel (PDCCH), a multi-Time Transmission Interval (TTI) scheduling message to the wireless device, the multi-TTI scheduling message comprising:
information indicating a set of dynamically allocated non-consecutive subframes in which the wireless device is to transmit data to the network node or to receive data from the network node;
information indicating a multi-TTI subframe pattern corresponding to subframes in which the wireless device shall receive data from the network node or transmit data to the network node; and
the multi-TTI subframe pattern indicating which subframes are on and may be allocated and which subframes are off and not to be allocated; and
wherein the multi-TTI scheduling message further comprises information indicating a number of on subframes, or information indicating a number of consecutive subframes associated with a time interval; and
transmit, by the network node in a radio resource control (RRC) message or a medium access control (MAC) message, to the wireless device, an indication of a number of candidate multi-TTI subframe patterns, wherein the downlink control information message transmitted on the physical downlink control channel indicates which one of the candidate multi-TTI subframe patterns is the multi-TTI subframe pattern.

23. The network node of claim 22:
wherein the transmitter is further adapted to transmit data to the wireless device in the dynamically allocated non-consecutive subframes; and wherein the network node further comprises a receiver adapted to receive data from the wireless device in the dynamically allocated non-consecutive subframes.

24. The network node of claim 22, wherein the multi-TTI scheduling message is at least one of:
a multi-TTI scheduling assignment for a downlink direction; and
a multi-TTI scheduling grant for an uplink direction.

25. The network node of claim 22:
wherein a reference point of the multi-TTI subframe pattern is at a subframe in which the multi-TTI scheduling message is received at the wireless device; or
wherein the reference point of the multi-TTI subframe pattern is determined based on radio frame timing.

26. The network node of claim 22:
wherein the subframe pattern matches subframes in which the wireless device is configured to be silent; or
wherein the subframe pattern matches subframes in which communication between the network node and the wireless device is prohibited.

27. The network node of claim 22, wherein:
the wireless device is configured with a plurality of candidate subframe patterns; and
the multi-TTI scheduling message comprises an indicator to a specific subframe pattern of the plurality of candidate subframe patterns.

28. The network node of claim 22, wherein the communications network is a Time-Division Duplexing (TDD) network or a Frequency-Division Duplexing (FDD) network.

29. The network node of claim 22, wherein:
the subframe is flexible with regards to being an uplink or downlink subframe; and
the multi-TTI scheduling message comprises information indicating an uplink state or a downlink state of a flexible subframe.

30. The network node of claim 22, wherein the multi-TTI scheduling message is associated with non-flexible subframes.

31. The network node of claim 22, wherein the network node is a base station and the wireless device is a user equipment.

32. A wireless device for handling scheduling of the wireless device in a communications network, wherein the wireless device is adapted to communicate with a network node over a radio channel, the wireless device comprising:
a receiver adapted to:
receive, in a downlink control information (DCI) message on a physical downlink control channel (PDCCH), a multi-Time Transmission Interval (TTI) scheduling message from the network node, the multi-TTI scheduling message comprising:
information indicating a set of dynamically allocated non-consecutive subframes in which the wireless device is to transmit data to the network node or to receive data from the network node;
information indicating a multi-TTI subframe pattern corresponding to subframes in which the wireless device shall receive data from the network node or transmit data to the network node;
the multi-TTI subframe pattern indicating which subframes are on and may be allocated and which subframes are off and not to be allocated; and
wherein the multi-TTI scheduling message further comprises information indicating a number of on subframes or information indicating a number of consecutive subframes associated with a time interval; and
receive, in a radio resource control (RRC) message or a medium access control (MAC) message, from the network node, an indication of a number of candidate multi-TTI subframe patterns, wherein the downlink control information message transmitted on the physical downlink control channel indicates which one of the candidate multi-TTI subframe patterns is the multi-TTI subframe pattern.

33. The wireless device of claim 32, further comprising a decoding circuit adapted to decode the received multi-TTI scheduling message.

34. The wireless device of claim 32:
wherein the receiver is further adapted to receive data from the network node in the dynamically allocated non-consecutive subframes; and
further comprising a transmitter adapted to transmit data to the network node in the dynamically allocated non-consecutive subframes.

35. The wireless device of claim 32, wherein the multi-TTI scheduling message is at least one of a multi-TTI scheduling assignment for a downlink direction and a multi-TTI scheduling grant for an uplink direction.

36. The wireless device of claim 32, wherein:
a reference point of the multi-TTI subframe pattern is a subframe in which the multi-TTI scheduling message is received at the wireless device; or
the reference point of the multi-TTI subframe pattern is determined based on radio frame timing.

37. The wireless device of claim 32:
wherein the subframe pattern matches subframes in which the wireless device is configured to be silent; or
wherein the subframe pattern matches subframes in which the communication between the network node and the wireless device is prohibited.

38. The wireless device of claim 32:
wherein the wireless device is configured with a plurality of candidate subframe patterns; and
wherein the multi-TTI scheduling message comprises an indicator to a specific subframe pattern of said plurality of subframe patterns.

39. The wireless device of claim 32, wherein the communications network is a Time-Division Duplexing (TDD) network or a Frequency-Division Duplexing (FDD) network.

40. The wireless device of claim 32, wherein:
the subframe is flexible with regards to being an uplink or downlink subframe; and
the multi-TTI scheduling message comprises information indicating an uplink state or downlink state of a flexible subframe.

41. The wireless device of claim 32, wherein the multi-TTI scheduling message is associated with non-flexible subframes.

42. The wireless device of claim 32, wherein the network node is a base station and the wireless device is a user equipment.

43. The method of claim 1, wherein said dynamically allocating includes dynamically allocating multiple TTIs via the set of non-consecutive subframes in which the network node is to transmit data to the wireless device or receive data from the wireless device.

44. The method of claim 1, wherein a TTI corresponds to a length of a subframe.

* * * * *